United States Patent [19]

Orcutt

[11] 4,142,548
[45] Mar. 6, 1979

[54] CONTROL FOR ROTATING ARM IRRIGATION SYSTEM

[76] Inventor: Allen R. Orcutt, Rush, Colo. 80833

[21] Appl. No.: 800,056

[22] Filed: May 24, 1977

[51] Int. Cl.² ............................................. B05B 3/00
[52] U.S. Cl. .................................... 137/344; 239/177
[58] Field of Search ............... 137/344; 239/177, 212, 239/213; 417/38

[56] References Cited
U.S. PATENT DOCUMENTS

| | | | |
|---|---|---|---|
| 3,628,729 | 12/1971 | Thomas | 137/344 |
| 3,750,696 | 8/1973 | Cornelius | 137/344 |
| 3,785,400 | 11/1974 | Zimmerer et al. | 239/212 |
| 3,816,025 | 6/1974 | O'Neill | 417/38 |
| 4,034,778 | 7/1977 | Sage et al. | 137/344 |

Primary Examiner—Martin P. Schwadron
Assistant Examiner—A. Michael Chambers
Attorney, Agent, or Firm—Wm. Griffith Edwards

[57] ABSTRACT

A control for a motor driven rotating arm crop irrigation system of the type having a low pressure control for stopping the water supply pump includes a normally closed discharge valve adjacent the supply connection to the arm. A control responsive to malfunction of the arm drive opens the discharge valve to release water and thereby decreases the pressure in the supply line; this lowers the pressure at the low pressure control of the supply which then operates to shut off the water supply. The power for the malfunction control including the discharge valve operation is supplied by a battery located adjacent the arm pivot and no electric power supply or control wires are required between the pivot area and the water supply equipment.

7 Claims, 3 Drawing Figures

CONTROL FOR ROTATING ARM IRRIGATION SYSTEM

My invention relates to equipment for irrigating crops and particularly to an improved control for rotating arm sprinkling systems having motor units at spaced intervals along the arm for rotating the arm.

Crop irrigating systems employing a multiplicity of sprinklers mounted at spaced intervals along a rotating arm have come into wide use. The arms on these systems may be a thousand or more feet in length and are supported on spaced wheel assemblies; the wheels of these assemblies are driven by motors at different speeds such that the assemblies normally lie in a straight line; the motor may be water turbines in which case the water discharged from the motors is supplied to spaced sprinkler heads mounted on the arm. Electric controls are provided including switches at spaced intervals along the arm which are operated in response to malfunction of the arm drive which results in misalignment of adjacent portions of the arm. It has been the practice to provide electric control and power cables between the pump control and the arm pivot. These cables are insulated and even if buried in the ground are subject to destruction of the insulation by gophers, ground squirrels and the like. Such destruction results in short circuiting of the control or power circuits and shutting down of the system. It is desirable to avoid such shutdowns and accordingly it is an object of my invention to provide a control for rotating arm irrigation systems including an improved arrangement for controlling the power supply in the event of malfunction of the arm drive.

It is another object of my invention to provide an improved control for crop irrigation systems of the individual motor driven rotating arm type.

Briefly, in carrying out the objects of my invention in one embodiment thereof, a crop irrigating system of the rotating arm type, wherein the arm is mounted on wheel assemblies driven by individual motors, is provided with an electric control system located adjacent the pivotal mounting support of the arm. Water under pressure is supplied to the arm from a remote pump located outside the area irrigated by the sprinklers on the arm. The pump control includes a low-pressure sensing mechanism for operating a switch and stopping operation of the pump in the event of a drop in supply line pressure. The control system adjacent the arm pivot mounting includes a storage battery and is provided for stopping the operation of the remote pumping system upon a malfunction of the arm driving system. In the event of malfunction of the arm, the pumping operation is stopped by the opening of a dump valve which reduces the pressure in the water pressure system causing the low pressure mechanism at the water supply to stop the pump motor. The control includes a normally closed switch for actuating the dump valve which, upon the occurrence of malfunction, is solenoid actuated to its open position, thereby lowering the pressure in the supply line and causing the pressure responsive control at the pump to de-energize the pump motor. The control system also includes a switch responsive to the pressurizing of the water supply at the arm pivot upon starting of the system for energizing the circuit of the malfunction control. This system requires no electric power or control cables between the pump equipment and the control circuit of the arm.

The features of novelty which characterize my invention are pointed out with particularity in the claims annexed to and forming a part of this specification. My invention itself, however, both as to its organization and manner of operation, together with further objects and advantages thereof, will best be understood upon reference to the following description taken in connection with the accompanying drawing in which:

Figure 1:
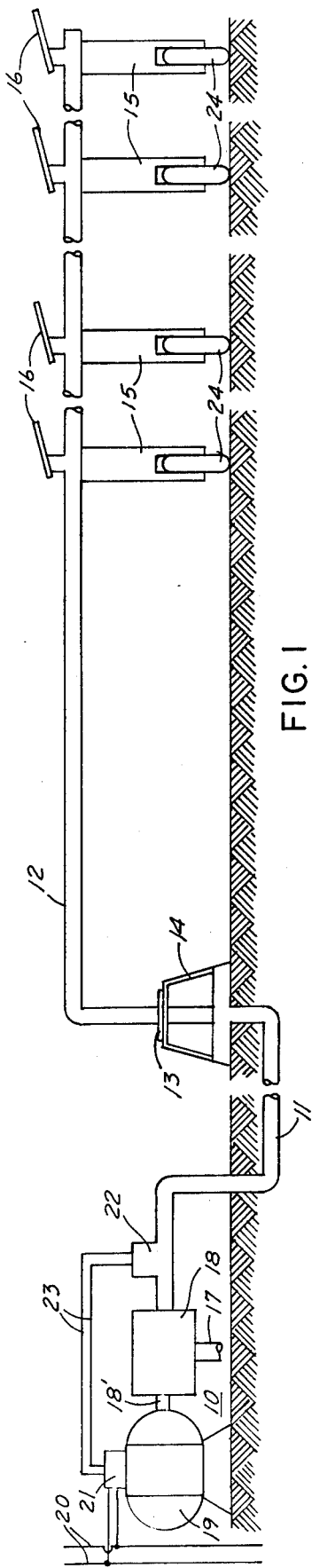
FIG. 1 is a diagrammatic side-elevation view of a crop irrigating system embodying my invention.
Figure 2:
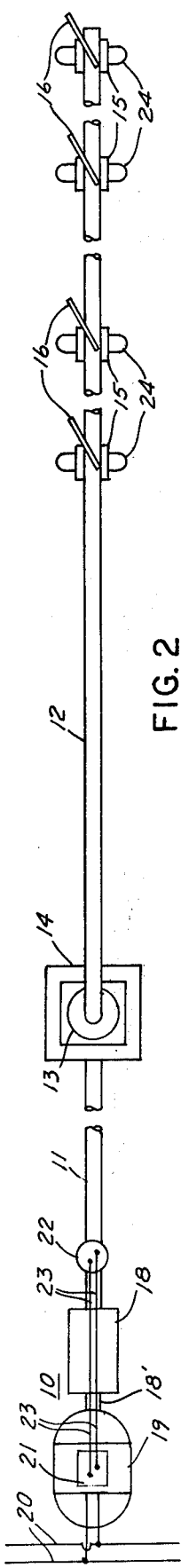
FIG. 2 is a top plan view of the system of FIG. 1.

Referring now to the drawings, FIGS. 1 and 2 illustrate the system which comprises a water supply unit 10 for supplying water under pressure to a supply line 11 connected to a rotatable arm 12 of an irrigation system, the connection being effected through a pivotal fitting 13 mounted in the central pivotal support structure 14 of the arm. The arm 12 is mounted in a position generally parallel to the ground and spaced therefrom by a plurality of drive wheel assemblies 15, and sprinkler heads 16 are arranged along the arm 12 at spaced intervals. The water supply equipment 10 is arranged to pump water under pressure from a well or other suitable source 17 to the water pressure supply line 11. The equipment 10 comprises a pump 18 connected to be driven through a shaft 18' by a suitable engine or motor shown, by way of example, as an electric motor 19 which is energized through electric supply lines 20, a motor controller 21 and a low-pressure responsive device 22 near the discharge of the pump. The device 22 is connected by control wires 23 to the controller 21 and operates to trip the controller to de-energize the motor upon occurrence of a predetermined low pressure in the pump discharge line 11.

Wheel units 15 are provided with wheels 24 which are driven by motors (not shown) which may be of the water turbine type, and are arranged within the units 15. When water driven motors are used, the water discharged from the motors is directed to outlets for irrigation use. The details of construction of the arm 12 and the support units 15 including their motors and the sprinkler heads 16 are not shown as they are not essential to an understanding of the present invention. The motors are driven at speeds depending upon their distance from the pivot assembly 13 so that the arm 12 is maintained in a straight line configuration. In the event of faulty operation of one or more of the motor driven units, the arm 12 tends to move out of its straight configuration and a detecting system (not shown) is provided for shutting off the operation of the motors on the occurrence of such malfunction. The system of my invention is arranged so that upon the occurrence of such malfunction, the pressure in the supply line 11 is reduced sufficiently to operate the low pressure responsive device 22 of the supply equipment 10 and stop the operation of the pump 18. Control of the pump is thus effected by the operation of the controls at the pivotal support structure 14 of the arm 12 and is done without requiring electric wire or cable connections between the arm controls and the motor control unit 10.

Figure 3:
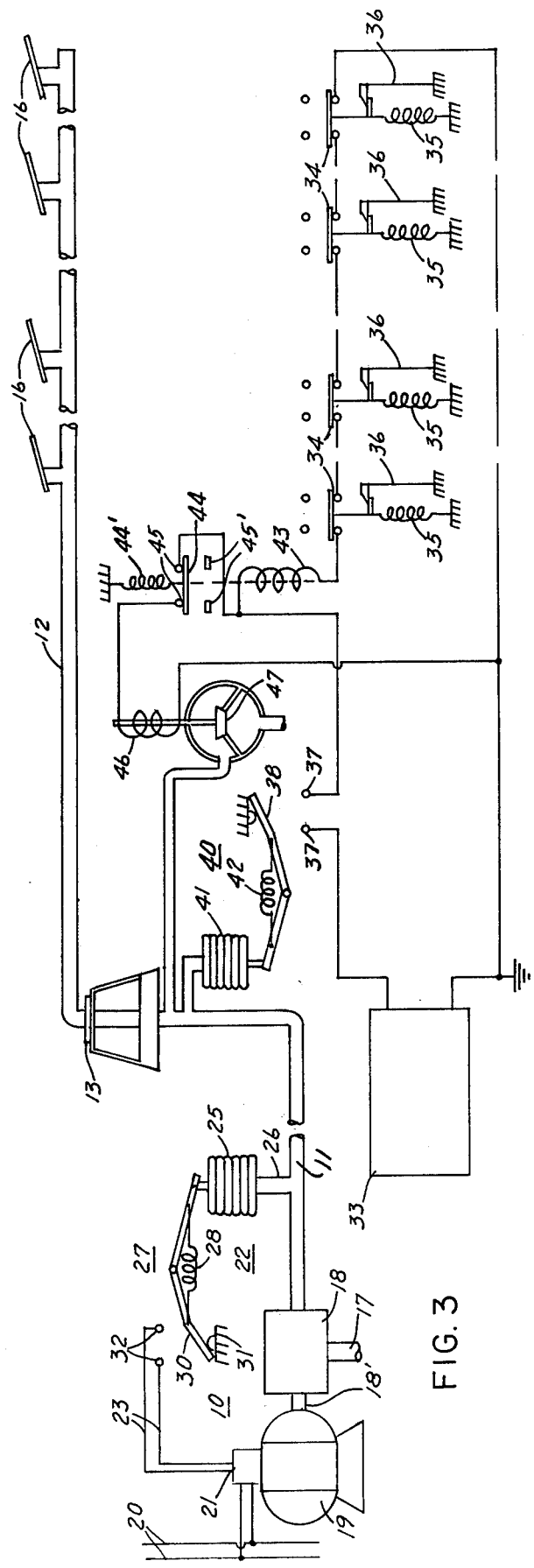
FIG. 3 is a schematic wiring diagram of the system.

The controls for the arm and sprinkler assembly are illustrated diagrammatically in FIG. 3. In this Figure, the low-pressure switch mechanism has been illustrated as of the bellows type wherein an expansible bellows 25 is connected through a tube 26 with the discharge 11 and arranged to operate an over center device 27; this device is illustrated in its low-pressure position wherein a spring 28 holds the switch arm of the device, indicated at 30, against a stop 31 out of engagement with a pair of switch contacts 32. The control 21 is arranged with a suitable device (not shown) for short-circuiting the contacts 32 during the starting period of the motor 19 so that pressure is built up in the discharge line 11 and the bellows 25 expanded to move the spring 28 over center and engage the contacts 32. The short-circuiting device is then inactivated and the system remains in operation with the switch mechanism 27 maintaining the control circuit closed. In the event that a low pressure occurs in the line 11, such that the bellows 25 contracts sufficiently to move the spring 28 again over center, the switch 32 is opened and the motor is stopped. The details of the controller 21 are not illustrated as they are not essential to an understanding of my invention.

The controls for the arm 12 including the malfunction controls and the sprinkler heads 16 are illustrated diagrammatically in the right-hand portion of FIG. 3. For the purpose of energizing the controls, a suitable source of power such as a storage battery 33 is provided within or adjacent the pivot support structure 14. The circuit for detecting malfunctions of the sprinkler arm is illustrated as including a plurality of normally open switches 34 biased to their open positions by springs 35 and illustrated as latched in their closed position by catches 36 arranged to be released by a malfunction detecting device (not shown) the details of construction of the detecting device not being essential to an understanding of the present invention. The switches 34 are connected in series with the power source 33 and with a pair of contacts 37 arranged to be closed by a switch arm 38 of the over-center device 40; the switch arm is arranged to be actuated by bellows 41 which expands to move the spring of the device, indicated at 42, over center and thus close the switch when the pressure in the line 11 exceeds a predetermined value. Thus, when the system is operating under normal conditions the switches 34 and the contacts connected in series by the arm 38 are energized by the battery 33 and energize a solenoid 43 to pull a switch 44 downwardly against the force of a spring 44' and out of engagement with its contacts 45 and against stop 45' thereby maintaining a solenoid 46 de-energized. The solenoid 46 is arranged to open a normally closed dump valve 47 and thus release water from the arm 12 in the event that any one of the malfunction detecting devices operates to release its catch 36 and de-energize the solenoid 43. When the dump valve is actuated in this manner, the pressure drops in the line 11 and the pressure sensitive switch 22 is opened and the motor 19 de-energized to stop the operation of the pump 18. The dropping of the pressure also operates to collapse the bellows 41 and open the switch 38. The entire system is returned to its inactive condition so that the malfunction may be investigated and corrected before the system is again started for operation. When the switch 38 is opened, the circuit for the switches 34 remains de-energized until the pump is again started. This also de-energizes the solenoid 46 and returns the valve 47 to its closed position. While the sprinkler head 16 has been shown as connected directly with the interior of the arm 12, it will be understood that for some installations these sprinklers may receive water from the individual motors adjacent the section on which they are located. The arm 12 for this purpose may be divided into suitable sections so that the water is distributed in proportion to its requirement for use and is directed into the motors and to the sprinklers in a manner such that the driving wheels 24 are rotated at speeds suitable to maintain the arm normally in a straight-line configuration.

It will be observed that the control of the system at the water supply unit 10 by utilizing the low pressure responsive device 22 results in shutting down the system for servicing in the event of malfunctioning of the arm 12 without requiring that electrical lines either for control or for supplying power be provided between the pump system 10 and the control at the pivotal support of the arm 12. The system thus makes it unnecessary to provide insulated wires which are subject to damage by rodents or otherwise such that the system would need to be closed down for servicing and repair.

It will be understood that, in systems employing electric motors for driving the units 15, the power supply to the motors will be disconnected by a suitable control actuated upon opening of any one of the switches 24, so that the electric motors are stopped as well as the supply of water to the sprinkler heads.

While the invention has been illustrated in connection with a specific arrangement of the sprinkler arm and control components, it will be understood that various other applications and modifications will occur to those skilled in the art. Therefore, I do not desire that my invention be limited to the details of the system as illustrated and described and I intend by the appended claims to cover all modifications which fall within the spirit and the scope of my invention.

I claim:

1. A control for a crop irrigating system of the type having an arm including a water delivery conduit mounted on individual motor driven wheel assemblies and rotated about a central pivot structure and means including a power driven water pressurizing means remote from said structure and a pipe for supplying water under pressure to said water delivery conduit and for discharging irrigation water therefrom from said conduit, said control comprising;

means responsive to a predetermined low pressure of the water in the supply pipe for stopping the water pressurizing means, and means near said central pivot structure and dependent upon a malfunction of the rotating arm for releasing the pressure on the water in said supply pipe sufficiently for actuating said low pressure responsive means to stop the supply of water.

2. A control for a crop irrigation system as set forth in claim 1 including an electric power source adjacent said central pivot structure and connected for energizing said malfunction dependent means.

3. A control for a crop irrigating system as set forth in claim 1, including a valve normally closed during operation of said system and connected in communication with said delivery conduit adjacent said structure and opened by operation of said malfunction dependent means for effecting said releasing of the pressure of the water in said supply pipe.

4. A control for a crop irrigating system as set forth in claim 3 wherein said valve is connected to release water from said system to the outside atmosphere.

5. A control for a crop irrigating system as set forth in claim 1 wherein said malfunction means includes an electric control circuit extending along said arm and means for closing said circuit upon pressurizing of the water in said arm conduit; and means dependent upon the malfunction of said arm for opening said circuit for effecting the actuation of said pressure releasing means.

6. A control for a crop irrigating system as set forth in claim 1 wherein said pressure releasing means includes a dump valve adjacent said pivotal structure for releasing water from the inlet to said water delivery conduit.

7. A control for a crop irrigating system as set forth in claim 1 wherein said individual motors are water turbines connected to receive water under pressure from said delivery conduit and wherein water after passing through said turbines is utilized for irrigation.

* * * * *